US008354161B2

(12) United States Patent
Lin et al.

(10) Patent No.: US 8,354,161 B2

(45) Date of Patent: Jan. 15, 2013

(54) FLATTENED BAMBOO PANEL

(75) Inventors: Hai Lin, Hangzhou (CN); Xufeng Xu, Hangzhou (CN); Hongzheng Liu, Hangzhou (CN)

(73) Assignee: Dasso Industrial Group Co., Ltd., Xinhe Village, Linpu Town, Xiaoshan District, Hangzhou (CN)

( * ) Notice: Subject to any disclaimer, the term of this patent is extended or adjusted under 35 U.S.C. 154(b) by 0 days.

(21) Appl. No.: 12/090,811

(22) PCT Filed: Sep. 28, 2007

(86) PCT No.: PCT/IB2007/003366

§ 371 (c)(1), (2), (4) Date: Apr. 18, 2008

(87) PCT Pub. No.: WO2008/038137

PCT Pub. Date: Apr. 3, 2008

(65) Prior Publication Data

US 2009/0178732 A1 Jul. 16, 2009

(30) Foreign Application Priority Data

Sep. 29, 2006 (CN) ...................... 2006 2 0108337 U

(51) Int. Cl.
*B32B 3/30* (2006.01)

(52) U.S. Cl. ....................................... 428/167; 428/156

(58) Field of Classification Search .................. 428/105, 428/156, 167, 172, 36.9; 144/34.17, 333, 144/364; 52/311.1

See application file for complete search history.

(56) References Cited

U.S. PATENT DOCUMENTS

| | | | | |
|---|---|---|---|---|
| 1,688,569 | A | 10/1928 | Wensel | |
| 2,582,065 | A * | 1/1952 | Rasor | 144/349 |
| 2,980,153 | A | 4/1961 | Burch | |
| 6,098,680 | A | 8/2000 | Nien et al. | |
| 2003/0079804 | A1 | 5/2003 | Hsu | |

FOREIGN PATENT DOCUMENTS

| | | |
|---|---|---|
| JP | 04067902 | 3/1992 |
| JP | 06039806 | 2/1995 |
| JP | 09057714 | 3/1997 |
| JP | 2006-255991 | 9/2006 |

OTHER PUBLICATIONS

JP 06-320504, Nov. 1994, with English Abstract.*
JP 09-193105, Jul. 1997, with English Absrtact.*
JP 2001-287205, Oct. 2001, with English Abstract.*
Machine translation of JP 09-057714.*
International Search Report for Hangzhou Dazhuang Floor Co., Ltd, PCT Application No. PCT/IB07/03366, Filed Sep. 28, 2007, Dated Sep. 10, 2008.

* cited by examiner

*Primary Examiner* — Donald J Loney

(74) *Attorney, Agent, or Firm* — DeHeng Chen, LLC; Rong Xie, Esq.

(57) ABSTRACT

A flattened bamboo panel is disclosed having one single, solid layer of pressed bamboo culm wall with most of the exterior and interior zones. The processed bamboo panel provides at least one of its longitudinal surfaces seamless and both longitudinal cross sections parallel to each other and perpendicular to the longitudinal surfaces. Also disclosed is the process of constructing such flattened bamboo panel.

4 Claims, 12 Drawing Sheets

FLATTENED BAMBOO PANEL

This application is the National Stage of International Application No. PCT/IB2007/003366, filed Sep. 28, 2007, which claims benefit of Chinese Serial No. 200620108337.5, filed Sep. 29, 2006. The contents of the preceding applications are hereby incorporated in their entireties by reference into this application.

FIELD OF THE INVENTION

The present invention pertains to the field of flattened bamboo panels.

BACKGROUND OF THE INVENTION

The present invention relates to a flattened bamboo panel having one single, solid layer of pressed bamboo culm wall with both exterior and interior zones. Made from one single bamboo cane, the processed bamboo panel is adhesive free. Also disclosed is the process of constructing such bamboo panel.

Various bamboo products are known in the art. Typically, bamboo panels are constructed from tube-shaped bamboo canes, which consist of nodes and culm wall. From outside to inside, the bamboo culm wall further comprises of exterior zone, middle zone and interior zone. To make a bamboo panel, a substantial portion of the exterior and interior zones of the culm wall is typically removed before it is extended and flattened to make the panel.

Problems that may arise in such process include low utilization rate of the raw material, excessive use of adhesive, obvious cracks on the surface of the processed panel and high manufacturing costs.

Numerous attempts have been tried to address the above problems. The common culm-splitting approach in bamboo plate industry has low material utilization rate, and its extensive use of adhesive also results in high manufacturing costs. The bamboo-tube-compressing-and-expanding approach improves the utilization rate; however, the processed panel surfaces often contain obvious cracks. The rotatory-cutting-and-expanding approach imposes stringent requirements on the shape of culm wall and therefore cannot be applied in mass production. The whole-bamboo-cane-extending approach improves the surface smoothness of the processed panel; however, the raw material utilization rate is still low because most of the exterior and interior zones of the bamboo culm wall must be removed. The thickness of the bamboo panels so constructed is often less than 8 mm.

Accordingly, there is a need for an improved method to construct bamboo panel from bamboo canes.

SUMMARY OF THE INVENTION

A flattened bamboo panel is constructed comprising a single layer of bamboo culm wall with its exterior, middle and interior zones.

According to another embodiment, a flattened bamboo panel is constructed comprising a single layer of bamboo culm wall, wherein the interior zone of the bamboo calm wall is marked with a plurality of diagonal cuts parallel to each other, with the angle formed by the cuts and the grain direction ranging between approximately 10° and 60°.

According to yet another embodiment, a bamboo panel is constructed comprising a single layer of bamboo culm wall, wherein the interior zone of the bamboo culm wall is marked with two sets of diagonal cuts in two different directions; cuts within each set are parallel to each other. The two sets of cuts are located on opposite side of the grain direction, with each set and the grain direction forming an angle of between approximately 10° and 60°.

A method of manufacturing the above flattened bamboo panel is disclosed, comprising the steps of: a) longitudinally cutting open a bamboo cane along its entire length to form one or more pieces of bamboo culm wall comprising an exterior zone, a middle zone and an interior zone; b) soaking and heating the bamboo culm wall, thereby forming a softened culm wall (the softening process); and c) flattening the softened culm wall in a gradual or multi-steps process.

An alternative method of manufacturing the above flattened bamboo panel comprising the steps of: a) longitudinally cutting open a bamboo cane along its entire length to form one or more pieces of bamboo culm wall comprising an exterior zone, a middle zone and an interior zone; b) marking the interior zone with a plurality of parallel cuts wherein the cuts and the grain direction form a degree between approximately 10° and 60°; c) soaking and heating the bamboo culm wall, thereby forming a softened culm wall; and d) flattening the softened culm wall.

DETAILED DESCRIPTION OF THE INVENTION

This invention provides a flattened bamboo panel comprising a single layer of bamboo culm wall, wherein said bamboo culm wall comprises an exterior zone, a middle zone, and an interior zone, wherein each of the exterior zone and interior zone contains an uttermost portion. In one embodiment, the flattened bamboo panel is constructed from one single bamboo cane.

The term "panel" refers to a comparatively thin, flat piece of wood or the like. In this invention, the term "panel" refers to a comparatively thin, flat piece of bamboo.

The processes disclosed in this invention may involve no use of adhesive. In one embodiment, the flattened bamboo panel is adhesive-free. In another embodiment, the flattened bamboo panel is a high-density panel.

Figure 1:
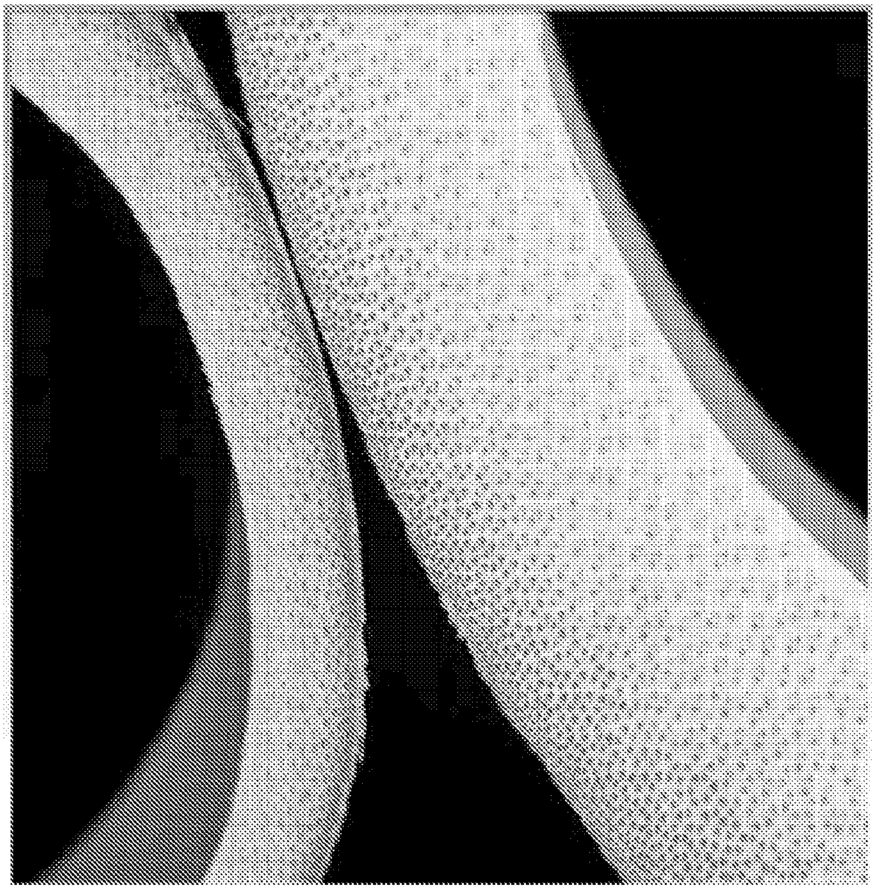
FIG. 1. illustrates a trimetric view of a section of bamboo cane.
Figure 2:
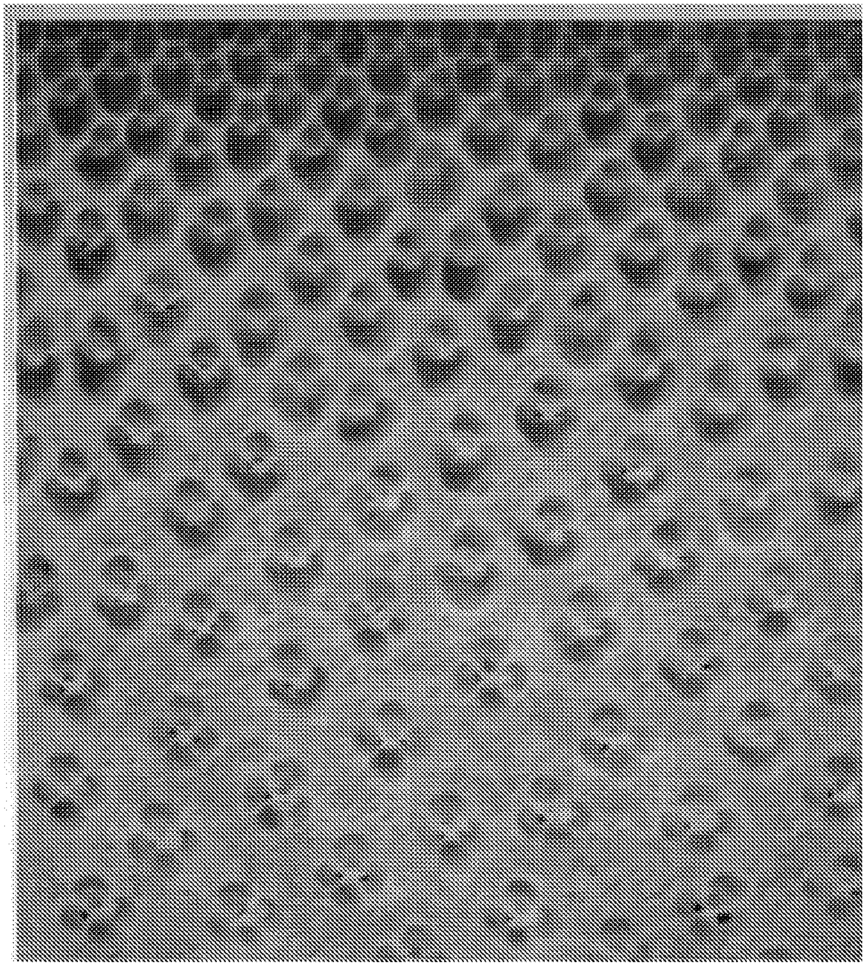
FIG. 2. illustrates a schematic view of the cross section of bamboo culm wall and different zones therein.

Referring to the drawings, a section of a bamboo cane is illustrated in FIG. 1, showing the bamboo cane 1 consists of bamboo node 2 and culm wall 3. A magnified view of the cross section of a bamboo cane 1 is illustrated in FIG. 2, showing that culm wall 3 further consists of three different zones with different fiber density and tissue types therein. Generally, exterior zone 4 of the culm wall 3 has a higher fiber density and a higher hardness than the interior zone 6. The culm wall between the exterior zone 4 and the interior zones 6 is defined in this application as the "middle culm zone" or "middle zone" 5. Each of the exterior zone and interior zone contains an uttermost portion. The uttermost portion of the exterior zone is located at the exterior surface of a bamboo culm wall. The uttermost portion of the interior zone is located at the interior surface of the bamboo culm wall.

Preliminary processing of raw bamboo canes may include one or more of the following steps: a) cutting a section of raw bamboo cane 1; b) removing node 2 (from outside of the bamboo cane); c) cutting and opening the bamboo cane along its longitudinal length to form one or several pieces of bamboo culm wall 3; d) further removing node 2 (from inside); e) soaking and heating the processed bamboo culm wall until the bamboo tissue is softened (the softening process).

Figure 3:
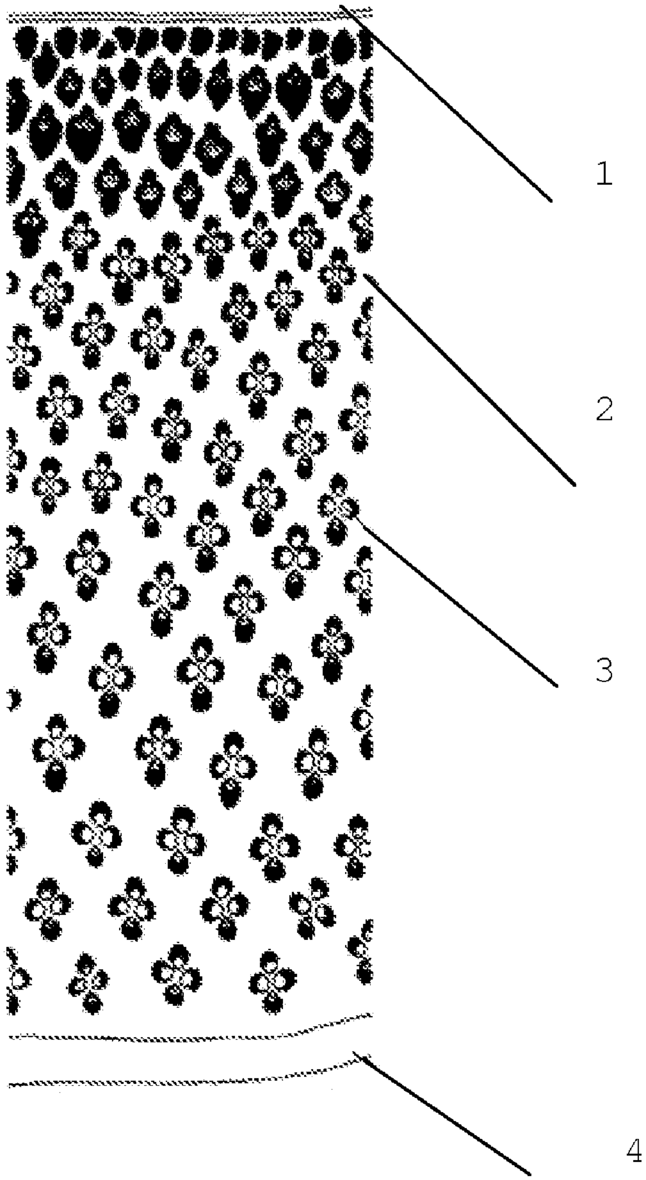
FIG. 3. illustrates a schematic view of the structure of a bamboo panel constructed according to the teachings of the present invention.

After the bamboo culm is preliminarily treated, it further needs to be extended, flattened and pressed to make a usable bamboo panel. A final bamboo panel product 7 is illustrated in FIG. 3. The panel 7 has two parallel longitudinal surfaces 9 (top) and 9*a* (bottom), two longitudinal cross sections 8 and 8*a*, which are parallel to each other and to the bamboo grain direction. The two longitudinal cross sections 8 and 8*a* are perpendicular to the two longitudinal surfaces 9 and 9*a*.

Bamboo panel products constructed by prior art often results in obvious cracks on surfaces due to improper extending and flattening method. In addition, the thickness of the final product (bamboo panel) is greatly limited because a large portion of the exterior zone and the interior zone must be removed before the flattening process.

Figure 10:
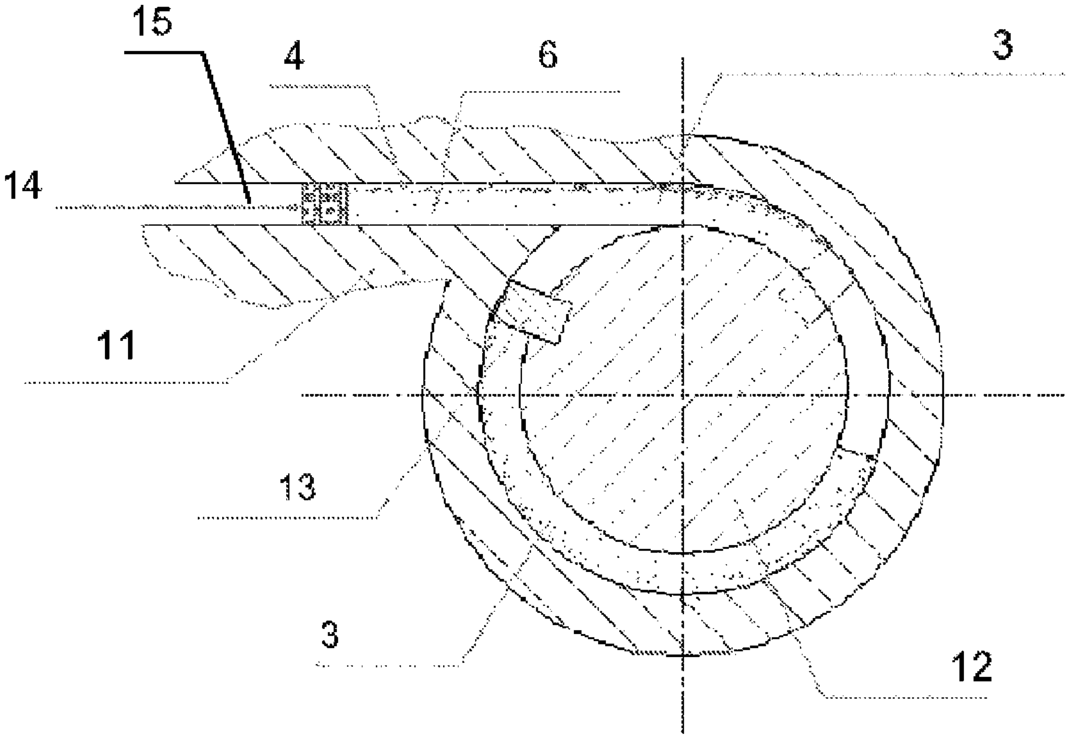
FIG. 10. illustrates a side view of the pressing devise at work with the softened culm wall inside.

A novel method is disclosed in this invention to properly extend and flatten the preliminarily treated bamboo panel. According to one embodiment, a method of manufacturing a flattened bamboo panel comprises the steps of: a) longitudinally cutting open a bamboo cane along its entire length to form one or more pieces of bamboo culm wall comprising an exterior zone, a middle zone and an interior zone; b) soaking and heating the bamboo culm wall, thereby forming a softened culm wall (the softening process); and c) flattening the softened culm wall in a gradual or multi-steps process. The preliminarily treated bamboo culm wall, in step c) above, is rotated and gradually flattened by using a rotating-flattening device. In another embodiment, the softened culm wall is gradually flattened by being pushed over a cylinder-shaped rotating axle. As illustrated in FIG. 10, the rotating-flattening device comprises an enclosing shell 11, a cylinder-shaped rotatable axle 12, and a protruding block 13 attached to axle 12 and connecting to the interior surface of the enclosing shell 11. A movable second block 14 is placed in the flattening section 15 to provide controllable pressure perpendicular to one of the longitudinal cross sections 8 or 8*a* of the culm wall 3. The preliminarily treated bamboo cane is placed into the tube-shaped gap formed between axle 12 and enclosing shell 15 with its longitudinal cross surface 8 and 8*a* touching blocks 13 and 14 respectively. Axle 12 is then turned counter clock-wise. As a result, the bamboo cane is gradually pushed into the flattening section 15 and flattened. As axle 12 is turning, controllable pressure is applied to block 14 so that the longitudinal cross sections 8 and 8*a* of the bamboo culm cane are pressed during the flattening process. Pressure applied to 8 and 8*a* helps to close cracks formed in the interior zone of the bamboo culm wall during the flattening process, thereby enhancing the panel density and surface hardness.

Figure 11:
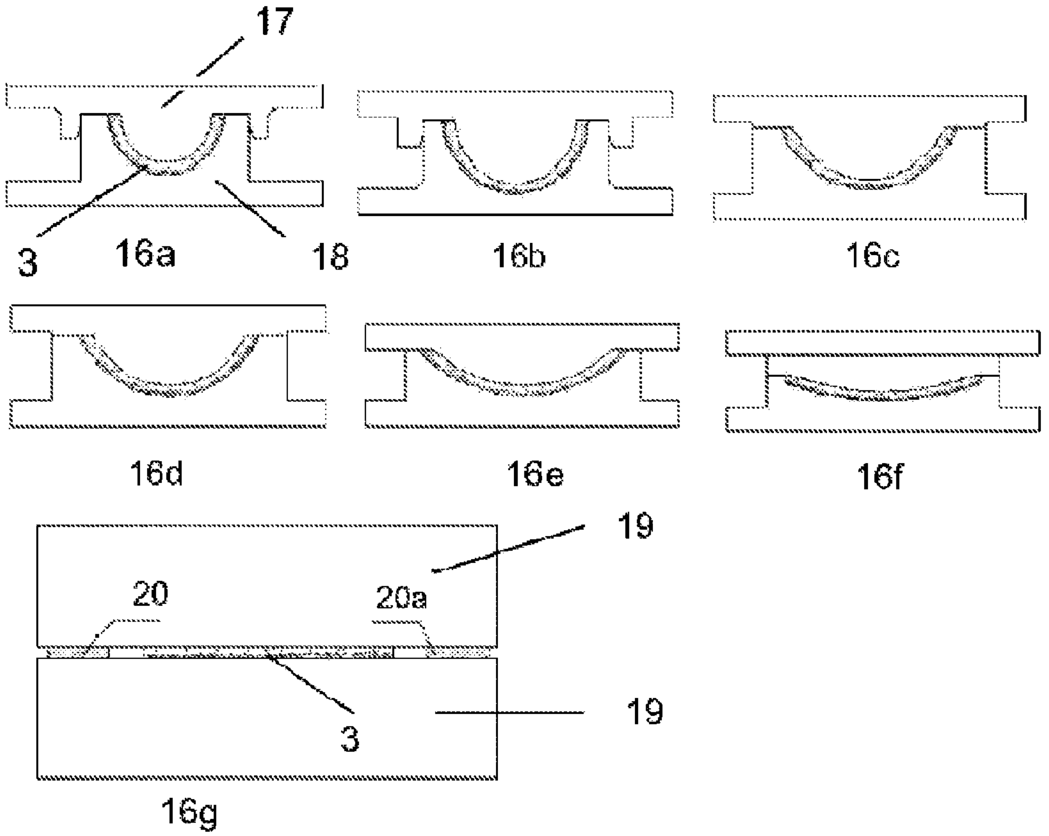
FIG. 11. illustrates side views of an alternative design of pressing devise used for gradually flattening the bamboo culm wall.

In a separate embodiment of the method of manufacturing a flattened bamboo panel, the softened culm wall is gradually flattened by a plurality or set of pressing devises, each of which has a different pressing arc. As illustrated in FIG. 11, the preliminarily treated bamboo culm wall 3 is gradually flattened by a plurality or set of pressing devices 16*a*-16*g*, each of which having a different pressing arc. In a still further embodiment, the softened culm wall is first pressed by a pressing device having the greatest pressing arc in the set, and is pressed last by a pressing device having the least pressing arc in the set. As shown in FIG. 11, the preliminarily treated bamboo culm wall 3 is first placed in device 16*a* (with an upper pressing board 17 and a base 18) and pressed. The same process is then repeated by using devices 16*b*, 16*c*, 16*d*, 16*e*, and 16*f*, each device having a slightly decreased pressing arc. For the last device used, the upper board 17 and base 18 are replaced by a pair of completely flat boards 19. Two blocks 20 and 20*a* are further placed in the last pressing device and the longitudinal cross sections 8 and 8*a* of the bamboo culm 3 are further compressed.

Figure 12:
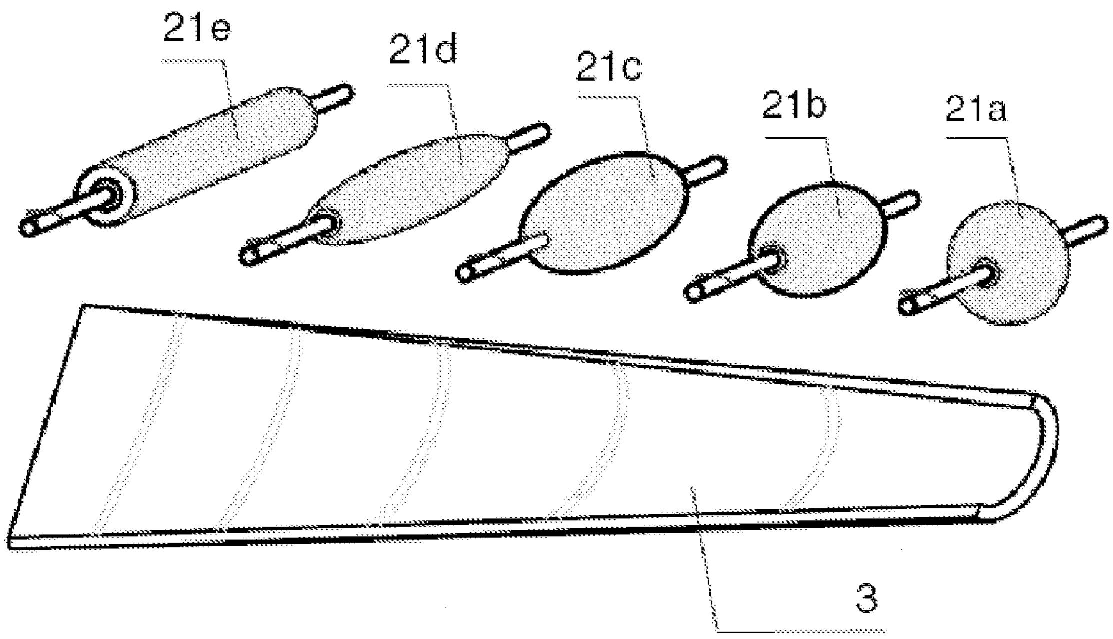
FIG. 12. illustrates a schematic view of yet another alternative design of pressing devise used for gradually flattening the bamboo culm wall.

In a separate embodiment of the method of manufacturing a flattened bamboo panel, the softened culm wall is gradually flattened by contacting a plurality or set of rollers, each of which has a different arc degree. As shown in FIG. 12, the preliminarily processed bamboo culm wall is gradually flattened by contacting a plurality or set of rollers, each of which having a different arc degree. In a still further embodiment, the softened culm wall is first pressed by a roller having the greatest arc degree in the set, and is pressed last by a roller having the least arc degree in the set. As shown in FIG. 12, the flattening process begins when the interior surface of the preliminarily processed culm wall 3 is run over by the first roller 21*a*, which has the highest arc degree. The process may then be repeated with the second, third, fourth and more roller(s), each with a gradually decreased arc degree. With the last roller being flat, culm wall 3 is completely flattened. The flattened bamboo panel may further be trimmed on the longitudinal cross sections 8 and 8*a*.

Figure 6:
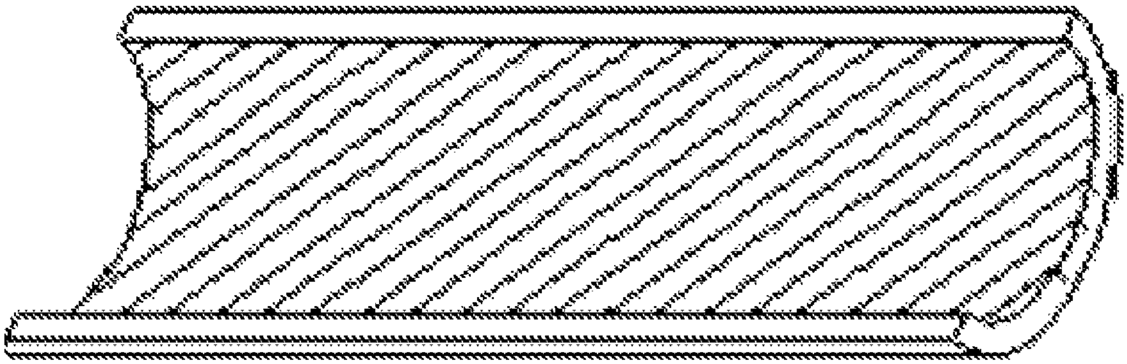
FIG. 6. illustrates a trimetric view of a piece of culm wall marked with non-penetrating, diagonal cut on its interior longitudinal surface before being pressed.
Figure 7:
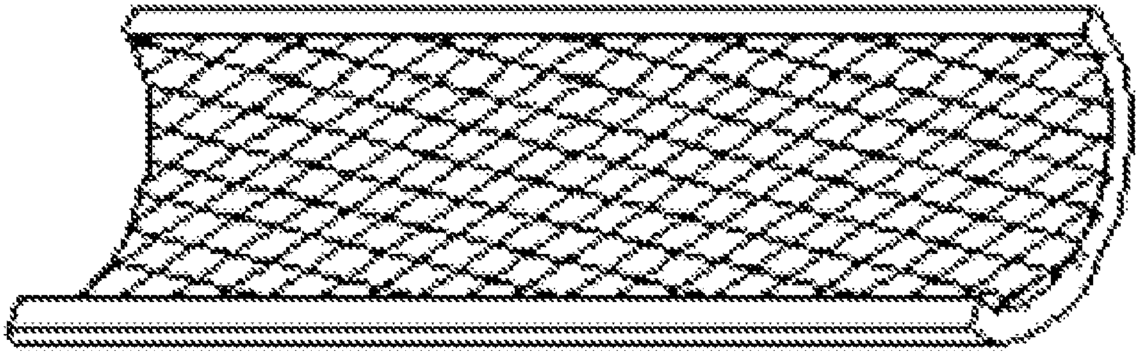
FIG. 7. illustrates a trimetric view of an alternative piece of culm wall marked with non-penetrating, diagonal cut on its interior longitudinal surface before being pressed.
Figure 8:
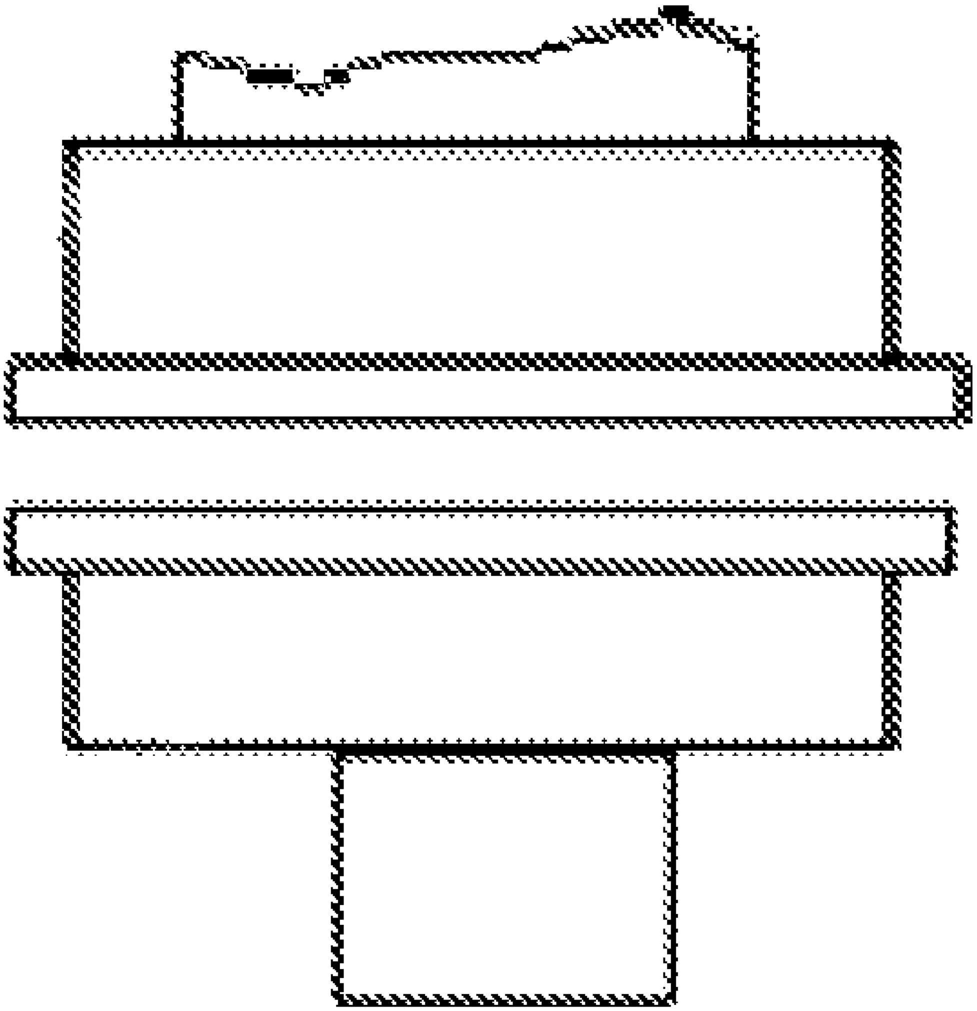
FIG. 8. illustrates a side view of a pressing devise used to press culm walls shown in FIGS. 6 and 7.
Figure 9:
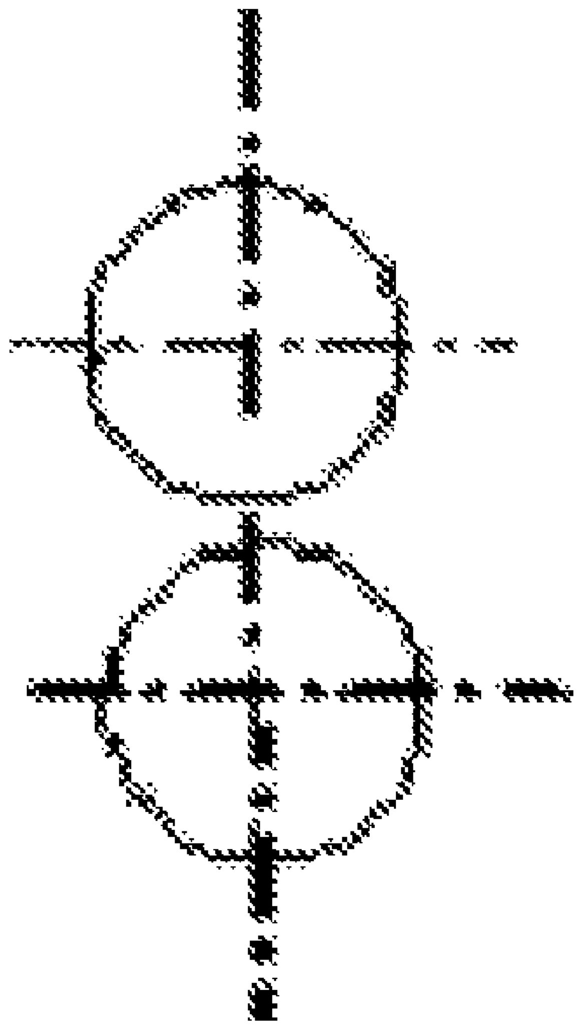
FIG. 9. illustrates a side view of an alternative pressing devise used to press culm walls shown in FIGS. 6 and 7.

Alternatively, the interior zone of a bamboo culm wall can be marked with a plurality of parallel diagonal cuts. As illustrated in FIGS. 6 and 7, a plurality of diagonal cuts 10 and 10*a* can be made on the interior zone of the bamboo culm wall before the bamboo culm wall is extended and flattened, for the purpose of directing and reducing cracks. The depth of the cuts depends on the hardness, shape and size of the bamboo culm wall. Generally, the diagonal cuts should penetrate the interior zone 6 and into, but not through, the middle zone 5. Flattening process performed by common pressing devices often results in cracks in the interior zone of the bamboo panel 7. Such cracks may penetrate through the entire culm wall and reach the top surface 9, resulting obvious cracks thereupon or even splitting the bamboo panel 7. Diagonal cuts made across the interior zone of the bamboo culm panel 7 tend to release pressure in the interior zone and make the flattening process easier without deepening the cracks.

Figure 4:
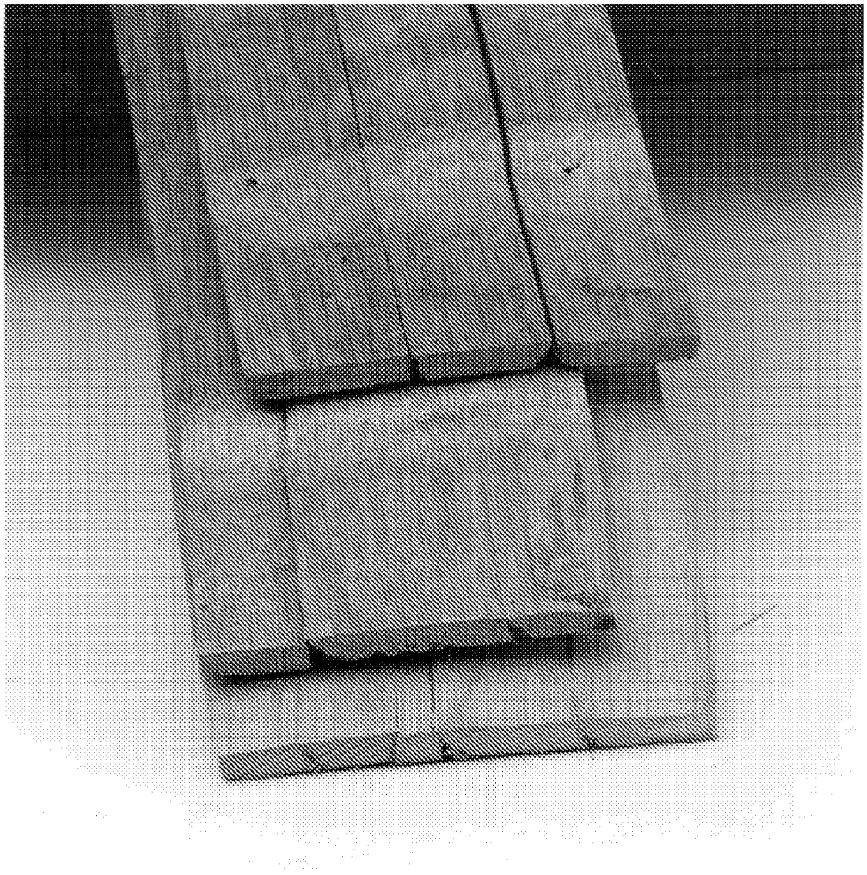
FIG. 4. illustrates a trimetric view of the structure of a variation of the bamboo panel as constructed according to the teachings of the present invention.

In one embodiment of the flattened bamboo panel, the interior zone of the flattened bamboo panel is marked with a plurality of parallel diagonal cuts. As shown in FIG. 4, a plurality of parallel diagonal cuts is made on the interior zone of the bamboo panel 10. In a still another embodiment of the flattened bamboo panel, an angel of between approximately 10° to 60° is formed between the diagonal cuts and grain direction of the bamboo panel. Also shown in FIG. 5, the angel formed between the diagonal cuts and grain direction of the bamboo panel is between approximately 10° to 60°.

Figure 5:
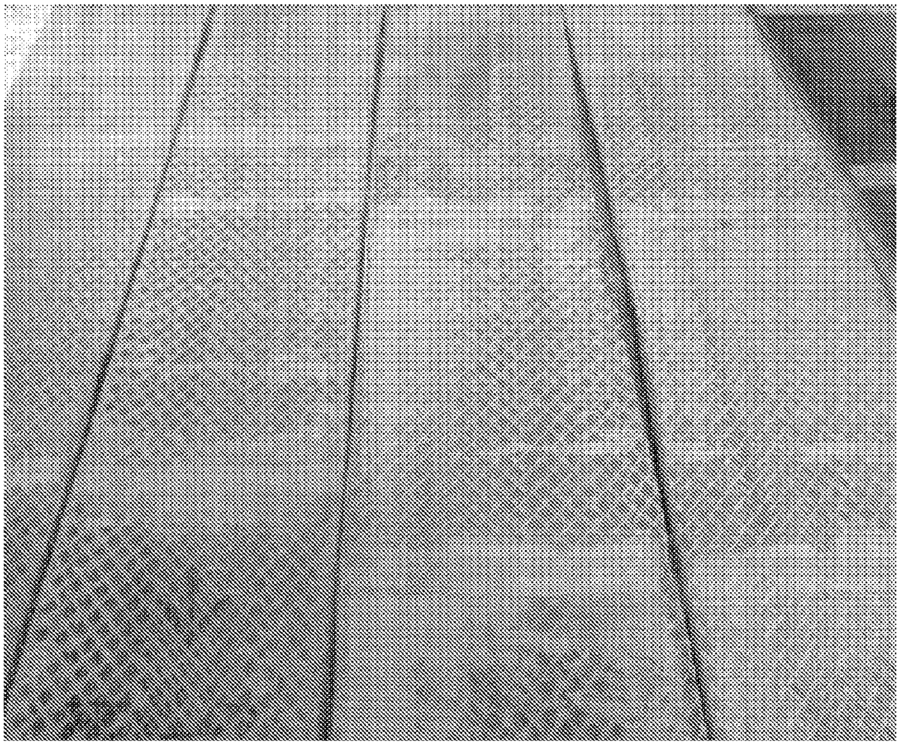
FIG. 5. illustrates a trimetric view of the structure of yet another variation of the bamboo panel as constructed according to the teachings of the present invention.

In another embodiment of the flattened bamboo panel, two sets of diagonal cuts (in two directions) are made on the interior zone of the bamboo panel; the diagonal cuts within each set are parallel to each other. It is important that the two sets of cuts are located in opposite side of the grain direction, and the angel formed by each cut and the grain direction is between approximately 10° and 60°. As shown in FIG. 5, two sets of diagonal cuts 10 and 10*a* (in two directions) are made on the interior zone of the bamboo panel 7; the diagonal cuts within each group are parallel to each other. Each set of cuts are located in opposite side of the grain direction, and the angel formed by each cut and the grain direction is between approximately 10° and 60°.

In a separate further embodiment, a method of manufacturing a flattened bamboo panel comprises the steps of: a) longitudinally cutting open a bamboo cane along its entire length to form one or more pieces of bamboo culm wall comprising an exterior zone, a middle zone and an interior zone; b) marking the interior zone with a plurality of parallel cuts wherein the cuts and the grain direction form a degree between approximately 10° and 60°; c) soaking and heating the bamboo culm wall, thereby forming a softened culm wall (the softening process); and d) flattening the softened culm wall. As shown in FIGS. 6, 7, 8 and 9, bamboo culm wall pieces after being marked with diagonal cuts can be extended and flattened using common flattening device (such as FIG. 8 and FIG. 9) without significant cracks being formed.

In another embodiment of the above-disclosed methods of manufacturing a flattened bamboo panel, the culm wall is soaked and heated to a temperature of about 140° C. to 200° C. in the softening process. In a still further embodiment, the temperature is preferably between approximately 160° C. and 190° C.

The process may further include a step of removing a portion of the exterior and interior zones of bamboo culm wall after the culm wall is flattened. In one embodiment of the method of manufacturing a flattened bamboo panel, a portion of the exterior zone and the interior zone of the bamboo culm wall is removed after the bamboo culm wall is flattened. Accordingly, in an embodiment of the flattened bamboo panel, an uttermost portion from each said exterior zone and interior zone is removed. In another embodiment of the flattened bamboo panel, a thickness of approximately 0.5 mm bamboo culm wall is removed from the uttermost portion of said exterior and interior zones.

The process disclosed above in this invention can greatly increase bamboo raw material utilization rate and significantly increase the thickness of the final panel product. As a result, the average thickness of the final panel can be as high as 4-25 mm. In a separate embodiment, the flattened bamboo panel has a thickness from about 4 to about 25 mm.

Finally, this invention provides a flattened bamboo panel made by the above disclosed methods. In some embodiment, this invention further provides a high-density, flattened bamboo panel made by the above disclosed methods.

What is claimed is:

1. An arc-shaped bamboo stem made by splitting a round hollow bamboo stem in the longitudinal direction, comprising an arc-shaped outer zone, a middle zone, and an interior zone, wherein the entire surface of said arc-shaped interior zone is covered with a plurality of diagonal cuts, and wherein said diagonal cuts penetrate the entire interior zone and into, but not through, the middle zone.

2. An arc-shaped bamboo stem of claim 1, wherein said bamboo stem is adhesive-free.

3. An arc-shaped bamboo stem of claim 1, wherein said bamboo stem is constructed from one single bamboo cane.

4. An arc-shaped bamboo stem of claim 1, wherein the entire surface of said arc-shaped interior zone is covered with two sets of diagonal cuts in two directions with each set of cuts located on opposite side of the grain direction and cuts within each set parallel to each other.

* * * * *